United States Patent
Chen et al.

(10) Patent No.: US 12,470,732 B2
(45) Date of Patent: Nov. 11, 2025

(54) PALETTE MODE CODING WITH DESIGNATED BIT DEPTH PRECISION

(71) Applicant: Google LLC, Mountain View, CA (US)

(72) Inventors: Cheng Chen, Milpitas, CA (US); Jingning Han, Santa Clara, CA (US); Hui Su, Sunnyvale, CA (US); Yaowu Xu, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 175 days.

(21) Appl. No.: 18/276,407

(22) PCT Filed: Feb. 9, 2021

(86) PCT No.: PCT/US2021/017206
§ 371 (c)(1),
(2) Date: Aug. 8, 2023

(87) PCT Pub. No.: WO2022/173417
PCT Pub. Date: Aug. 18, 2022

(65) Prior Publication Data
US 2024/0305802 A1    Sep. 12, 2024

(51) Int. Cl.
*H04N 19/00* (2014.01)
*H04N 19/14* (2014.01)
(Continued)

(52) U.S. Cl.
CPC ............. *H04N 19/44* (2014.11); *H04N 19/14* (2014.11); *H04N 19/176* (2014.11); *H04N 19/186* (2014.11)

(58) Field of Classification Search
None
See application file for complete search history.

(56) References Cited

U.S. PATENT DOCUMENTS

| | | | |
|---|---|---|---|
| 2019/0116380 A1* | 4/2019 | Chuang | H04N 19/93 |
| 2021/0051336 A1* | 2/2021 | Chao | H04N 19/174 |
| 2022/0337843 A1* | 10/2022 | Jang | H04N 19/174 |

FOREIGN PATENT DOCUMENTS

WO    2020/207421 A1    10/2020

OTHER PUBLICATIONS

International Search Report and Written Opinon of International Application No. PCT/US2021/017206 dated Nov. 22, 2021, 16 pgs.

(Continued)

*Primary Examiner* — Zhihan Zhou
(74) *Attorney, Agent, or Firm* — Young Basile Hanlon & MacFarlane, P.C.

(57) ABSTRACT

Syntax elements are written to a bitstream to designate bit depth precision for palette mode coding of video blocks. During encoding, a bit depth to use for palette mode coding a current block may be based on an input video signal including the current block or based on some change in bit depth precision. A prediction residual for the current block is encoded to a bitstream along with syntax elements indicative of the bit depth used for the palette mode coding of the current block. In particular, the syntax elements include a first element indicating the palette mode coding bit depth used and a second element indicating whether to apply a bit offset to the palette mode coding bit depth. During decoding, values of the syntax elements are read from the bitstream and used to determine a bit depth for palette mode coding the encoded block.

20 Claims, 9 Drawing Sheets

(51) Int. Cl.
*H04N 19/176* (2014.01)
*H04N 19/186* (2014.01)
*H04N 19/44* (2014.01)

(56) References Cited

OTHER PUBLICATIONS

Zhu (Bytedance) W et al: "Non-CE8: Palette mode with 8-bit entries", JVET Meeting; Oct. 1, 2019-Oct. 11, 2019; Geneva; (The Joint Video Exploration Team of ISO/IEC JTC1/SC29/WG11 and ITU-T SG.16 Sep. 25, 2019, Retrieved from the Internet: URL: http://phenix.intevry.fr/jvet/doc enduser/documents/16 Geneva/wgll/ JVET-P0421- vl.zip JVET-P0421.docx.

De Rivaz et al, 'AVl Bitstream & Decoding Process Specification', Nov. 12, 2018 (Nov. 12, 2018), pp. 1-666, XP055531803; Retrieved from the Internet: URL:https://aomediacodec.github.io/avl-spe c/avl-spec.pdf [retrieved on Dec. 7, 2018].

\* cited by examiner

PALETTE MODE CODING WITH DESIGNATED BIT DEPTH PRECISION

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for decoding an encoded block from a bitstream according to an implementation of this disclosure comprises reading, from the bitstream, a first value indicating a palette mode coding bit depth used to encode the encoded block. A second value indicating whether to apply a bit offset to the palette mode coding bit depth is also read from the bitstream. A palette mode prediction block is generated for the encoded block using a set of palette colors determined based on the first value and the second value. reconstructed block is generated using the palette mode prediction block. The reconstructed block is then output for storage or display.

In some implementations of the method, when the second value indicates to apply the bit offset, the set of palette colors is limited based on a maximum palette mode coding bit depth.

In some implementations of the method, the method further comprises shifting the palette mode coding bit depth according to the bit offset to determine a bit depth for the encoded block, wherein the set of palette colors is limited based on the bit depth being greater than the maximum palette mode coding bit depth.

In some implementations of the method, the maximum palette mode coding bit depth is 8 bits.

In some implementations of the method, when the second value indicates other than to apply the bit offset, the set of palette colors is based on the palette mode coding bit depth.

In some implementations of the method, the first value and the second value are encoded to a sequence header within the bitstream.

In some implementations of the method, the first value and the second value are encoded to a frame header within the bitstream.

In some implementations of the method, the first value is written in the bitstream using three bits and the second value is written in the bitstream using one bit.

An apparatus for decoding an encoded block from a bitstream according to an implementation of this disclosure comprises a memory and a processor configured to execute instructions stored in the memory. The instructions include instructions to read a first value indicating a palette mode coding bit depth used to encode the encoded block from the bitstream, read a second value indicating whether to apply a bit offset to the palette mode coding bit depth from the bitstream, generate a palette mode prediction block for the encoded block using a set of palette colors determined based on the first value and the second value, generate a reconstructed block using the palette mode prediction block, and, output the reconstructed block for storage or display. When the second value indicates to apply the bit offset, the set of palette colors is limited based on a maximum palette mode coding bit depth. When the second value indicates other than to apply the bit offset, the set of palette colors is based on the palette mode coding bit depth.

In some implementations of the apparatus, the instructions include instructions to shift the palette mode coding bit depth according to the bit offset to determine a bit depth for the encoded block when the second value indicates to apply the bit offset, in which the set of palette colors is limited based on the bit depth being greater than the maximum palette mode coding bit depth.

In some implementations of the apparatus, the maximum palette mode coding bit depth is 8 bits.

In some implementations of the apparatus, the first value and the second value are encoded to a sequence header within the bitstream.

In some implementations of the apparatus, the first value and the second value are encoded to a frame header within the bitstream.

A non-transitory computer-readable storage device according to an implementation of this disclosure includes program instructions executable by one or more processors that, when executed, cause the one or more processors to perform operations for decoding an encoded block from a bitstream, in which the operations comprise reading, from the bitstream, a first value indicating a palette mode coding bit depth used to encode the encoded block and a second value indicating whether to apply a bit offset to the palette mode coding bit depth. A prediction block for the encoded block is generated using a set of palette colors determined based on the first value and the second value. A reconstructed block generated using the prediction block is then output for storage or display.

In some implementations of the non-transitory computer-readable storage device, when the second value indicates to apply the bit offset, the set of palette colors is limited based on a maximum palette mode coding bit depth.

In some implementations of the non-transitory computer-readable storage device, the operations further comprise shifting the palette mode coding bit depth according to the bit offset to determine a bit depth for the encoded block, in which the set of palette colors is limited based on the bit depth being greater than the maximum palette mode coding bit depth.

In some implementations of the non-transitory computer-readable storage device, the maximum palette mode coding bit depth is 8 bits.

In some implementations of the non-transitory computer-readable storage device, when the second value indicates other than to apply the bit offset, the set of palette colors is based on the palette mode coding bit depth.

In some implementations of the non-transitory computer-readable storage device, the first value and the second value are encoded to a sequence header within the bitstream.

In some implementations of the non-transitory computer-readable storage device, the first value and the second value are encoded to a frame header within the bitstream.

These and other aspects of this disclosure are disclosed in the following detailed description of the implementations, the appended claims, and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
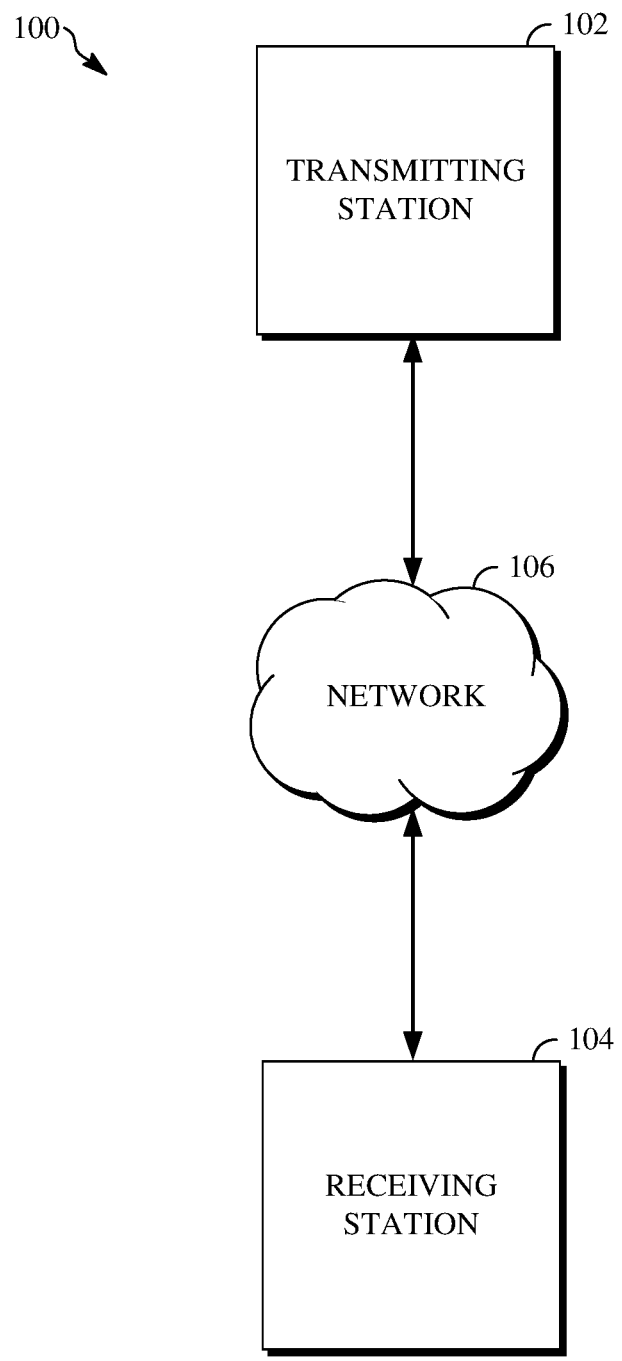
FIG. 1 is a schematic of an example of a video encoding and decoding system.

Video compression schemes may include breaking respective images, or video frames, into smaller portions, such as video blocks, and generating an encoded bitstream using techniques to limit the information included for respective video blocks thereof. The encoded bitstream can be decoded to re-create the source images from the limited information. Encoding or decoding a video block can include predicting motion within that video block, such as with respect to one or more other video blocks in the same video frame or in a different video frame.

For certain types of video content, for example, videos of screen capture or video games, block information may be predicted using a relatively small number of colors. The AV1 codec introduced a palette mode intra prediction to address these use cases, in which a few pixel values, referred to as base colors, are used to represent the pixel value in each pixel of a given block. In particular, a palette predictor for each plane of a block is specified by a color palette with two to eight colors and color indices for the pixels of the block. The use of palette mode intra prediction in video content with relatively few unique colors generally may lead to improved coding efficiency compared to the use of other prediction approaches.

AV1 supports 8-bit, 10-bit, and 12-bit coding of input video signals. It also supports internal high bit depth encoding for low bit depth input signals, in which an input 8-bit signal is converted into a 10-bit or 12-bit signal. Typically, the internal high bit depth achieves high compression efficiency and greater color fidelity given that the precision is higher, but at greater computational expense. As such, the coding efficiency of palette mode intra prediction for internal high bit depth pipelines may be considered unsatisfactory. For example, where the input signal is 8-bit and converted into 10-bit or 12-bit, the coding performance (e.g., measured using peak signal-to-noise ratio (PSNR)) may be measurably worse than if the 8-bit signal were encoded without first being converted to the higher bit depth.

This performance regression is due to a bitstream overhead. Specifically, the deficit of the coding performance is due to the way palette colors are written into the bitstream in AV1. In AV1, for each block, the selected colors are sorted in ascending order and the first color is written into the bitstream, thereby consuming N bits, in which the value of N is the converted bit depth. Deltas of two neighbor colors are then written in the following bits of the bitstream, in which each delta consumes M bits, where the value of M depends on the difference between the current color and a maximum value equal to $2^N-1$. Given that the color value increases during coding, the difference between the current color and the maximum value decreases during coding such that the value of M is also non-increasing.

Because AV1 literally codes palette color coding information into the bitstream (i.e., without entropy coding), palette colors of 10-bit and 12-bit converted signals will consume more bits than 8-bit signals since the base colors have a larger range and require more bits. Therefore, even though the bit depth precision improves the overall accuracy of the block prediction using the AV1 palette mode intra prediction tool, the bit consumption overhead ultimately makes the overall compression efficiency worse.

Implementations of this disclosure address problems such as these using a designated bit depth precision technique for palette mode coding. Syntax elements palette_bit_depth and palette_bit_offset are introduced by this disclosure and encoded to a bitstream at the sequence level or frame level to indicate the bit depth precision to use for palette mode coding of encoded blocks. In particular, the value of palette_bit_depth indicates a palette mode coding bit depth used to encode an encoded block, and the value of palette_bit_offset indicates whether to apply a bit offset to the palette mode coding bit depth. A set of palette colors usable to generate a palette mode coding prediction block during the decoding of the encoded block is then determined based on the values of those syntax elements.

In some cases, the value of palette_bit_depth can be same as the current encoding bit depth, in which case palette mode coding may be performed as set forth in AV1. However, in other cases, such as when the value of palette_bit_offset indicates to apply a bit offset, the value of palette_bit_depth can be lower than the current encoding bit depth, in which case an 8-bit representation of the palette colors may be enforced in the bitstream to limit or prevent unnecessary overhead. For example, where the encoding bit depth is 12, the value of palette_bit_depth can be set to 8. This would require that palette colors be scaled down to the 8-bit range, instead of the original bit depth range. Thus, the set of palette colors usable to generate a palette mode coding prediction block is limited when the value of palette_bit_offset indicates to apply a bit offset.

Examples of how the implementations of this disclosure may be used will now be described. In a first example, an original input signal may be 8-bit and converted to 10-bit or 12-bit for encoding. In this case, a performance regression is inevitable where the syntax elements palette_bit_depth and palette_bit_offset are not used. Therefore, upon determining that the original input signal is 8-bit and converted to a higher bit depth, the value of palette_bit_depth can be set to 8, and the value of palette_bit_offset can be set to 1 to indicate to shift the three-bit value of palette_bit_depth to achieve the value of 8 (e.g., such that palette_bit_offset operates as a fourth, leftmost bit of palette_bit_depth). This ensures that the selected palette colors can be represented by an 8-bit integer, and 8-bit precision is accordingly used for the encoding of palette colors for one or more corresponding blocks. In a second example, an original input signal may be 10-bit or 12-bit. In this case, an 8-bit color representation may or may not be sufficient to precisely represent signal values. An encoder-specific approach may be used to determine whether to use the syntax element palette_bit_depth to help improve coding efficiency.

Further details of techniques for palette mode coding with designated bit depth precision are described herein with initial reference to a system in which such techniques can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
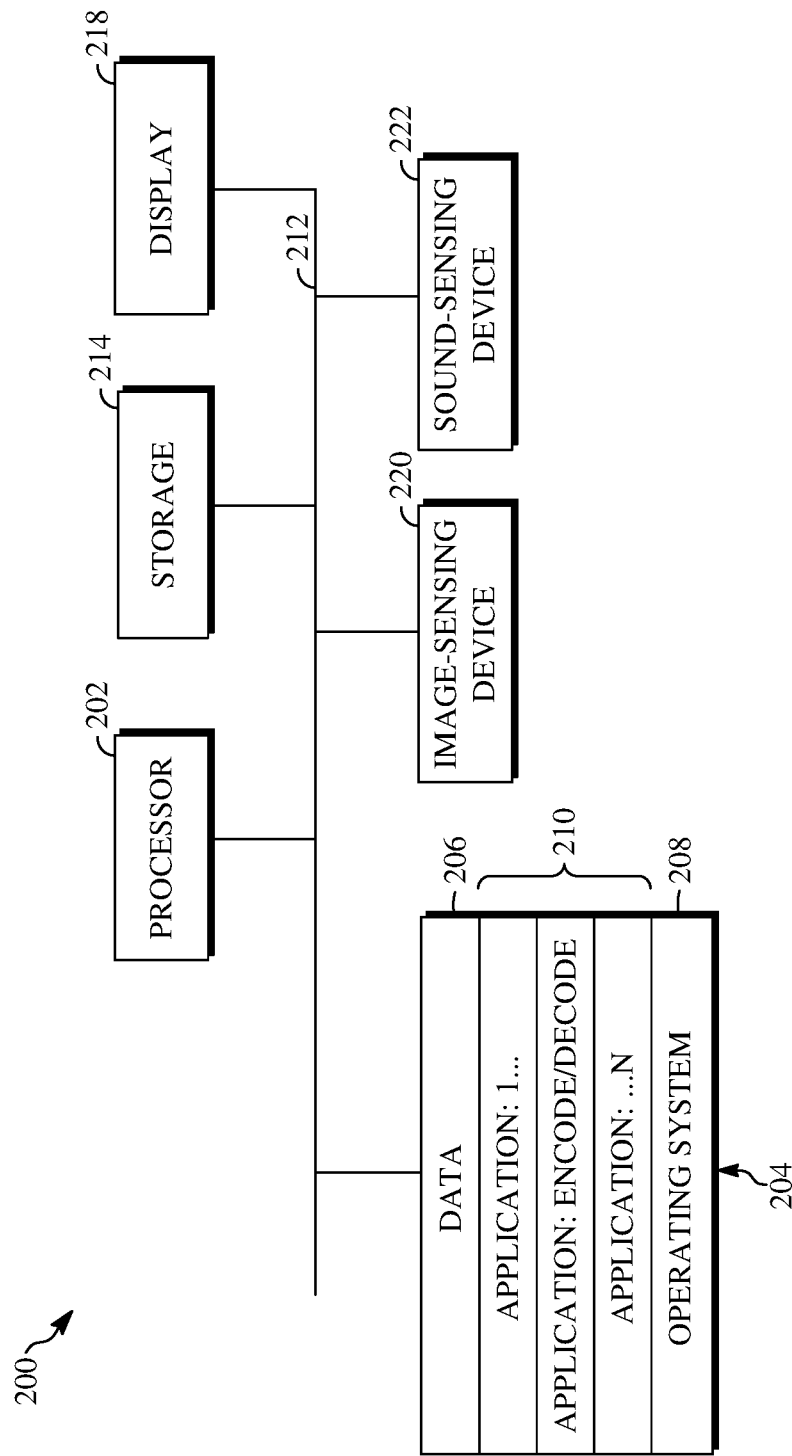
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a video streaming protocol based on the Hypertext Transfer Protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random-access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include encoding and/or decoding software that performs some or all of the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into a single unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
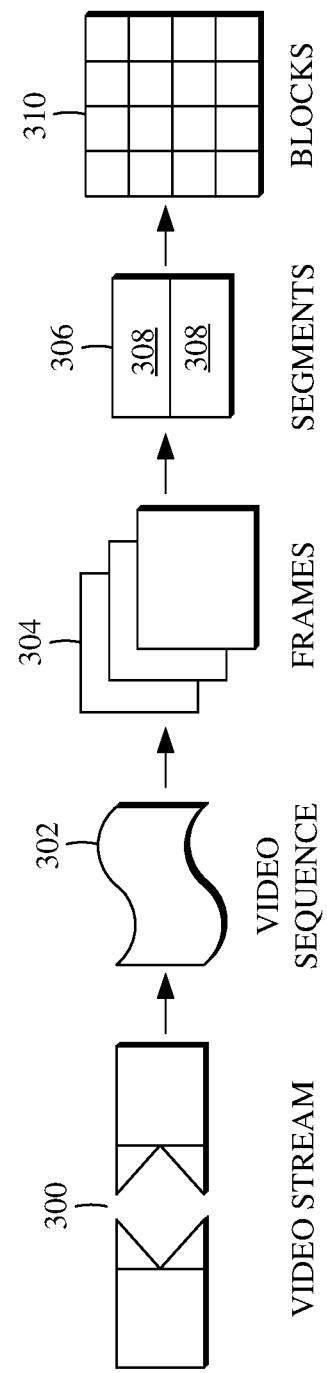
FIG. 3 is a diagram of an example of a video stream to be encoded and decoded.

FIG. 3 is a diagram of an example of a video stream 300 to be encoded and decoded. The video stream 300 includes a video sequence 302. At the next level, the video sequence 302 includes several adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, N×M pixels in the frame 306, in which N and M may refer to the same integer value or to different integer values. The blocks 310 can also be arranged to include data from one or more segments 308 of pixel data. The blocks 310 can be of any suitable size, such as 4×4 pixels, 8×8 pixels, 16×8 pixels, 8×16 pixels, 16×16 pixels, or larger up to a maximum block size, which may be 128×128 pixels or another N×M pixels size.

Figure 4:
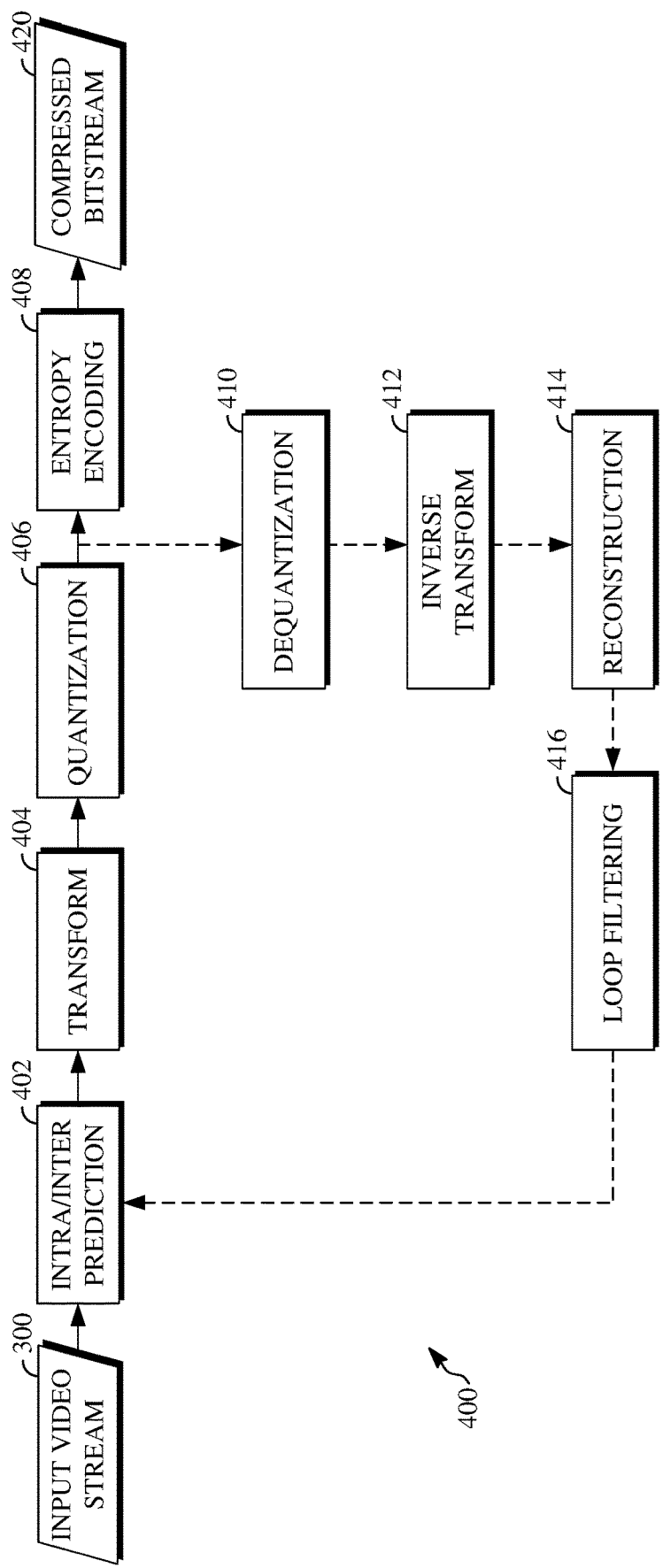
FIG. 4 is a block diagram of an example of an encoder.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In some implementations, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

In some cases, the functions performed by the encoder 400 may occur after a filtering of the video stream 300. That is, the video stream 300 may undergo pre-processing according to one or more implementations of this disclosure prior to the encoder 400 receiving the video stream 300. Alternatively, the encoder 400 may itself perform such pre-processing against the video stream 300 prior to proceeding to perform the functions described with respect to FIG. 4, such as prior to the processing of the video stream 300 at the intra/inter prediction stage 402.

When the video stream 300 is presented for encoding after the pre-processing is performed, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters which may be applied at the loop filtering stage 416 include, without limitation, a deblocking filter, a directional enhancement filter, and a loop restoration filter.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
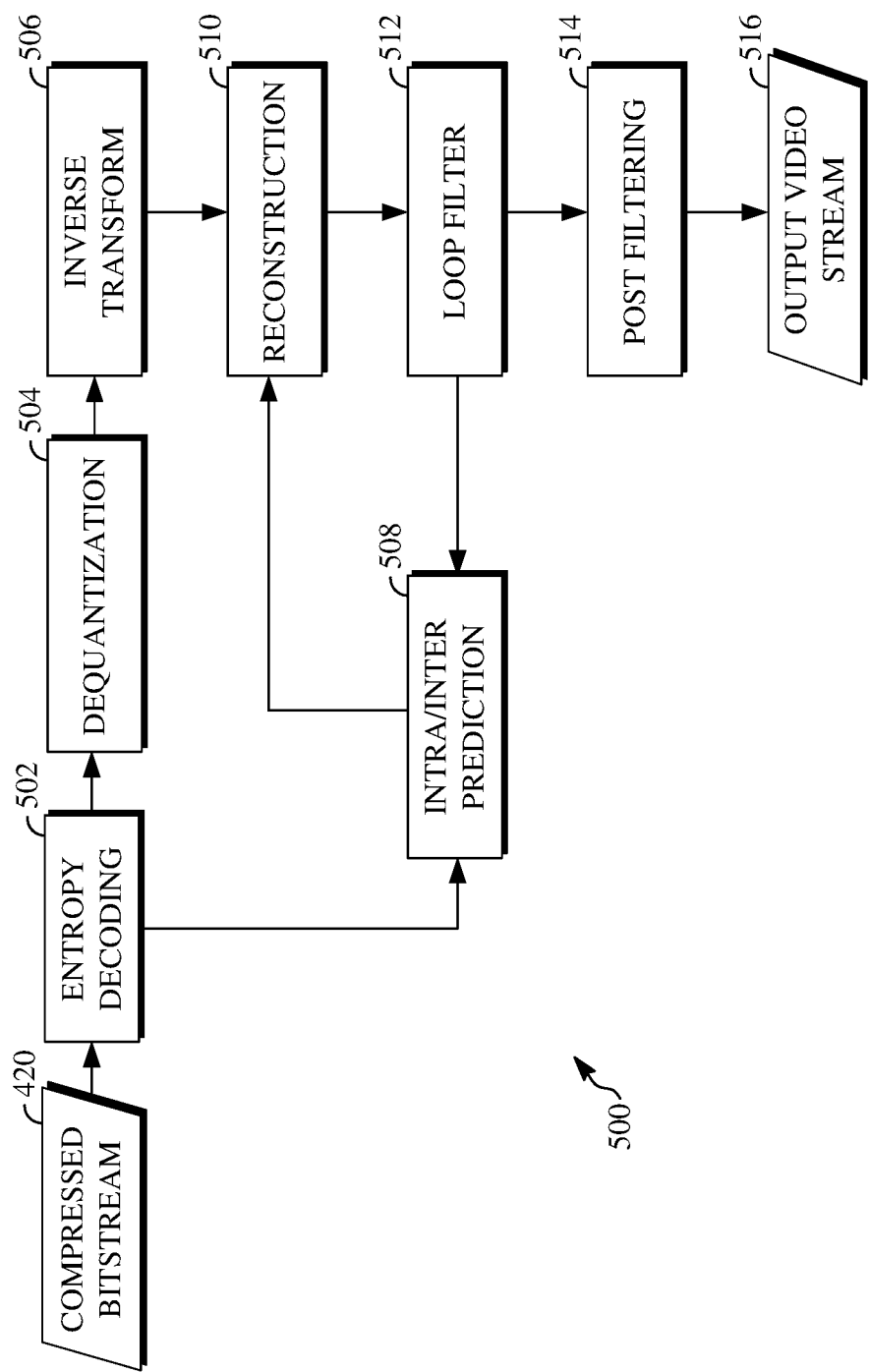
FIG. 5 is a block diagram of an example of a decoder.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106. In some implementations, the decoder 500 is a hardware decoder.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Examples of filters which may be applied at the loop filtering stage 512 include, without limitation, a deblocking filter, a directional enhancement filter, and a loop restoration filter. Other filtering can be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514 or otherwise omit the post filter stage 514.

Figure 6:
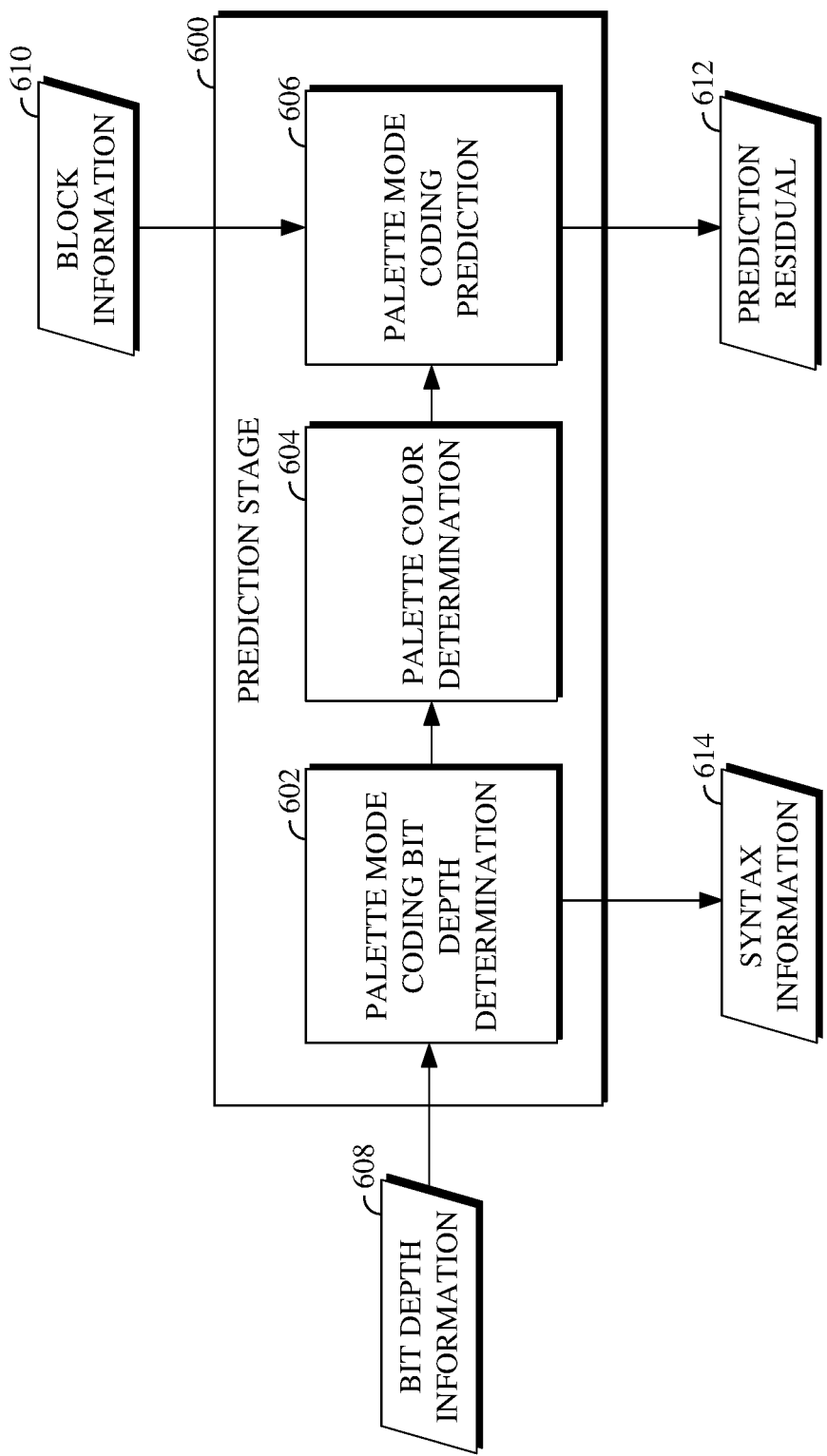
FIG. 6 is a block diagram of a prediction stage of an encoder used for palette mode coding of a current block.

FIG. 6 is a block diagram of a prediction stage 600 of an encoder used for palette mode coding of a current block. The prediction stage 600 may, for example, be the intra/inter prediction stage 402 of the encoder 400 shown in FIG. 4. The prediction stage 600 includes functionality for palette mode coding a current block of an input video stream. As shown, the prediction stage 600 includes a prediction mode coding bit depth determination tool 602, a palette color determination tool 604, and a palette mode coding prediction tool 606.

The palette mode coding bit depth determination tool 602 uses bit depth information 608 associated with an input video signal to determine a bit depth to use for palette mode coding of a current block. For example, the palette mode coding bit depth determination tool 602 may determine an initial bit depth based on the bit depth information 608. The initial bit depth may, for example, be a bit precision to use to represent colors of the current block. The bit depth to use for the palette mode coding of the current block may be the same as the initial bit depth or different from the initial bit depth. In particular, a maximum palette mode coding bit depth may be defined, for example, as 8 bits. Where the initial bit depth is greater than the maximum palette mode coding bit depth, the initial bit depth may be limited based on the maximum palette mode coding bit depth, for example, to a maximum bit depth of 8 bits. However, where the initial bit depth is less than or equal to the maximum palette mode coding bit depth, the initial bit depth may be used as the bit depth for the palette mode coding.

The palette color determination tool 604 determines a set of palette colors usable for palette mode coding of the current block based on the bit depth determined by the palette mode coding bit depth determination tool 602. In particular, the set of palette colors is limited to a color range associated with the maximum palette mode coding bit depth. The palette color determination tool 604 determines the set of palette colors for the current block from a color palette determined for other blocks within a neighborhood of the current block.

The palette mode coding prediction tool 606 receives the set of palette colors determined by the palette color determination tool 604 and block information 610 representative of the current block and uses those to generate a palette mode prediction block for the current block. In particular, the palette mode coding prediction tool 606 performs palette mode prediction using the block information 610 and the set of palette colors to generate the palette mode prediction block, which is a prediction block for the current block. A prediction residual 612 may then be determined using the palette mode prediction block. The prediction residual 612 may be further processed at the encoder to prepare it to be written within a bitstream.

Syntax information 614 including syntax elements indicative of the bit depth used for the palette mode coding at the prediction stage 600 are also written to the bitstream to which the prediction residual 612, once encoded, is written. The syntax elements include a first value indicating the palette mode coding bit depth for the block and a second value indicating whether to apply a bit offset to the palette mode coding bit depth. For example, the first value may be the value of the variable palette_bit_depth while the second value may be the value of the variable palette_bit_offset.

The first value consumes three bits of the bitstream and the second value consumes one bit of the bitstream. The possible values of the first value include 000, 001, 010, 011, 100, 101, 110, and 111, which on their own may respectively signal a bit depth of 0, 1, 2, 3, 4, 5, 6, and 7. The possible values of the second value include 0 and 1. Where the second value has a value of 0, the value of the first value is used as the bit depth for the current block. However, where the second value has a value of 1, the value of the second value is shifted by 8. Thus, where the second value has a value of 1, the possible values of the first value include 000, 001, 010, 011, 100, 101, 110, and 111, which when shifted by the second value may respectively signal a bit depth of 8, 9, 10, 11, 12, 13, 14, and 15. In some implementations, certain values of the first value may not be used. For example, valid ranges of bit depths may be defined for palette mode coding. In some such implementations, the bit depths which may be defined as valid for the palette mode coding of a current block may include 2, 3, 4, 5, 6, 7, 8, 9, 10, 11, and 12. For example, bit depths below 2 and above 12 may not be considered.

The first value may be written before the second value. Alternatively, the first value may be written after the second value. The syntax elements may be written to a header within the bitstream. In one example, the syntax elements may be written to a sequence header. In such a case, the syntax elements may be used for palette mode coding of blocks within a series of consecutive frames associated with the sequence header. In this way, the same palette mode values may be re-used for multiple frames. In another example, the syntax elements may be written to a frame header. In such a case, the syntax elements may be used for palette mode coding of blocks of the frame associated with the frame header. In this way, palette mode values are determined for individual frames.

The palette mode coding bit depth determination tool 602 may represent functionality performed once for an entire frame of the input video stream or once for a sequence of frames of the input video stream. For example, the bit depth and the set of palette colors used for palette mode coding blocks may be determined at the frame-level or at the sequence-level. For example, the initial bit depth and bit depth determined at the palette mode coding bit depth determination tool 602 may be determined for a frame or a sequence of frames rather than for a block. For example, the initial bit depth may represent a bit precision to use to represent colors of the frame or sequence of frames.

Figure 7:
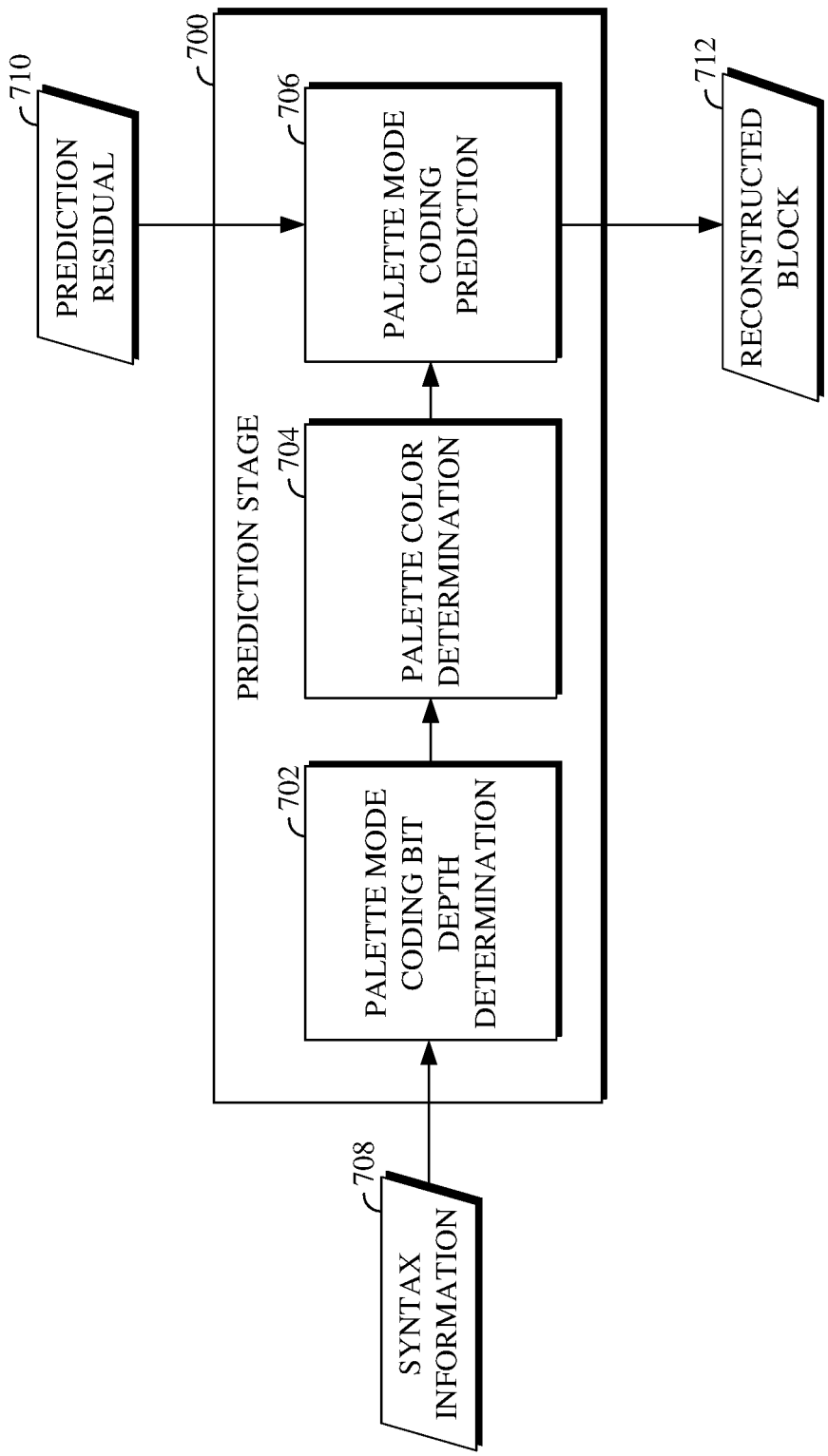
FIG. 7 is a block diagram of a prediction stage of a decoder used for palette mode coding of a current block.

FIG. 7 is a block diagram of a prediction stage 700 of a decoder used for palette mode coding of a current block. The prediction stage 700 may, for example, be the intra/inter prediction stage 508 of the decoder 500 shown in FIG. 5. The prediction stage 700 includes functionality for palette mode coding an encoded block from a bitstream. As shown, the prediction stage 700 includes a prediction mode coding bit depth determination tool 702, a palette color determination tool 704, and a palette mode coding prediction tool 706.

The palette mode coding bit depth determination tool 702 receives syntax information 708 representing syntax elements written to the bitstream and reads values of those syntax elements to determine a bit depth for palette mode coding of the encoded block. In particular, the palette mode coding bit depth determination tool 702 reads values of those syntax elements from the bitstream and uses those values to determine the bit depth. The values include a first value indicating the palette mode coding bit depth for the block and a second value indicating whether to apply a bit offset to the palette mode coding bit depth. For example, the first value may be the value of the variable palette_bit_depth while the second value may be the value of the variable palette_bit_offset.

The palette mode coding bit depth determination tool 702 determines whether to apply the bit offset based on the second value and then uses the first value based on that determination. In particular, where the second value indicates to apply the bit offset, the palette mode coding bit depth determination tool 702 shifts the bit depth according to the bit offset to determine the bit depth for the encoded block. As described above, the application of the bit offset is based on the bit depth for palette mode coding having been limited by a maximum palette mode coding bit depth, for example, 8 bits. The first value may be read before the second value. Alternatively, the second value may be read before the first value.

An example of pseudocode usable to determine the bit depth for palette mode coding of the encoded block at the prediction mode coding bit depth determination tool 702 follows:

```
color_config( ) {
    high_bitdepth
    if ( seq_profile == 2 && high_bitdepth ) {
        twelve_bit
        BitDepth = twelve_bit ? 12 : 10
    } else if (seq_profile <= 2 ) {
        BitDepth = high_bitdepth ? 10 : 8
    }
    palette_bit_depth
```

In the above example of pseudocode, the function color_config( ) refers to functionality described herein with respect to the palette mode coding bit depth determination tool 702, and high_bitdepth, twelve_bit, and palette_bit_depth all refer to variables written to the bitstream. The variables high_bitdepth and twelve_bit each consume one bit of the bitstream, and the variable palette_bit_depth consumes three bits thereof. The if clause checks whether the bit depth for the encoded block is 12 bits. If it is, the bit depth for the encoded block is understood to be 12 bits. Otherwise, it is assumed that the bit depth for the encoded block is 10 bits. The else if clause checks whether the variable high_bitdepth is signaled for use with the encoded block. For example, the variable high_bitdepth may be signaled where the encoding of the encoded block used a bit depth greater than a maximum palette mode coding bit depth, which may, for example, be 8 bits. If the variable high_bitdepth is not signaled for use with the encoded block, it is assumed that the bit depth for the encoded block is 8 bits.

The variable seq_profile refers to the capabilities of the decoder with respect to the processing of certain types of video data. Different values of seq_profile may require certain features to be supported, in which, generally, the higher the value, the more features are required. In some implementations, the variable seq_profile may be omitted from the above pseudocode.

The palette color determination tool 704 determines a set of palette colors usable for palette mode coding of the encoded block based on the bit depth determined by the palette mode coding bit depth determination tool 702. In particular, the set of palette colors is limited to a color range associated with the maximum palette mode coding bit depth. The palette color determination tool 704 determines the set of palette colors for the encoded block from a color palette determined for other blocks within a neighborhood of the current block.

The palette mode coding prediction tool 706 receives the set of palette colors determined by the palette color determination tool 704 and a prediction residual 710 for the encoded block and uses those to generate a palette mode prediction block for the current block. In particular, the palette mode coding prediction tool 706 performs palette mode prediction using the prediction residual 710 and the set of palette colors to generate the palette mode prediction block, which is a prediction block for the encoded block. A reconstructed block 712 may then be determined using the palette mode prediction block. The reconstructed block 712 may be further processed at the decoder to prepare it to be output for storage or display.

The palette mode coding bit depth determination tool 702 may represent functionality performed once for an entire encoded frame written to the bitstream or once for a sequence of encoded frames written to the bitstream. For example, the bit depth and the set of palette colors used for palette mode coding blocks may be determined at the frame-level or at the sequence-level. For example, the initial bit depth and bit depth determined at the palette mode coding bit depth determination tool 702 may be determined for a frame or a sequence of frames rather than for a block. For example, the syntax information 708 may represent values to use to determine a bit depth for palette mode coding of the entire frame or sequence of frames.

Figure 8:
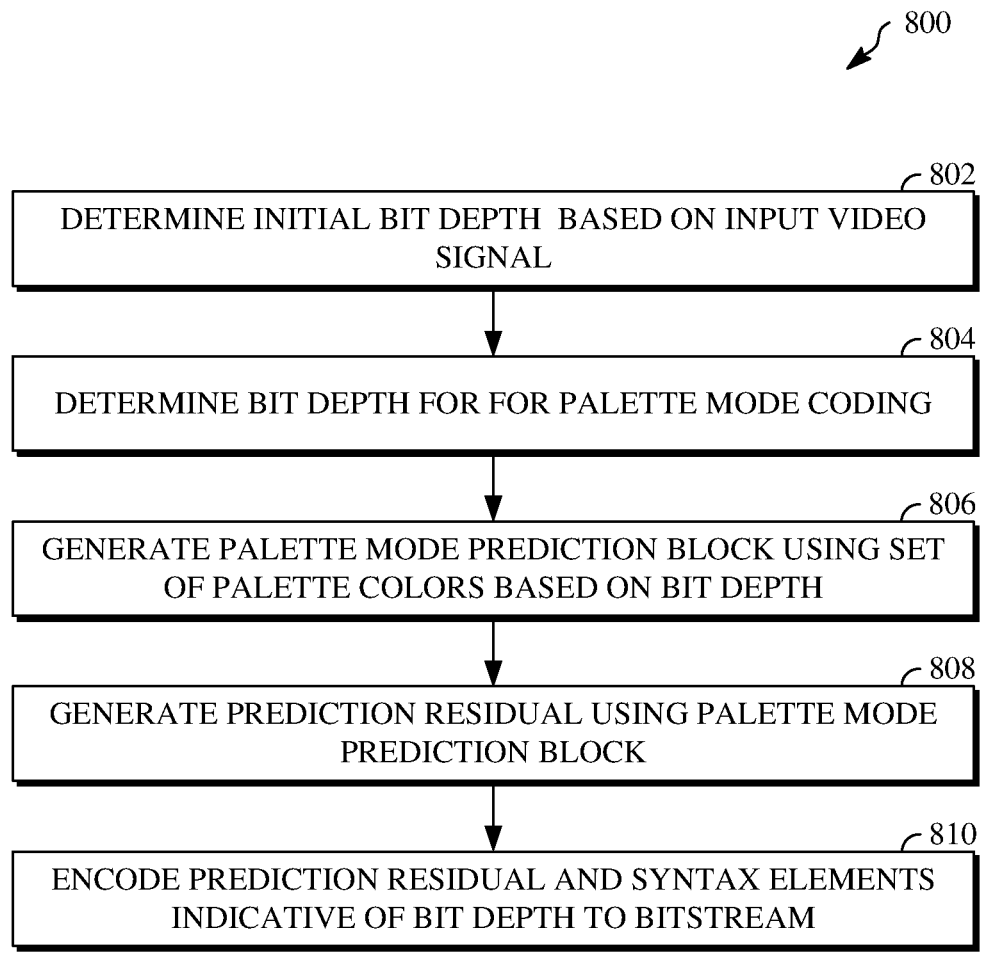
FIG. 8 is a flowchart diagram of an example of a technique for encoding a current block using palette mode coding with designated bit depth precision.
Figure 9:
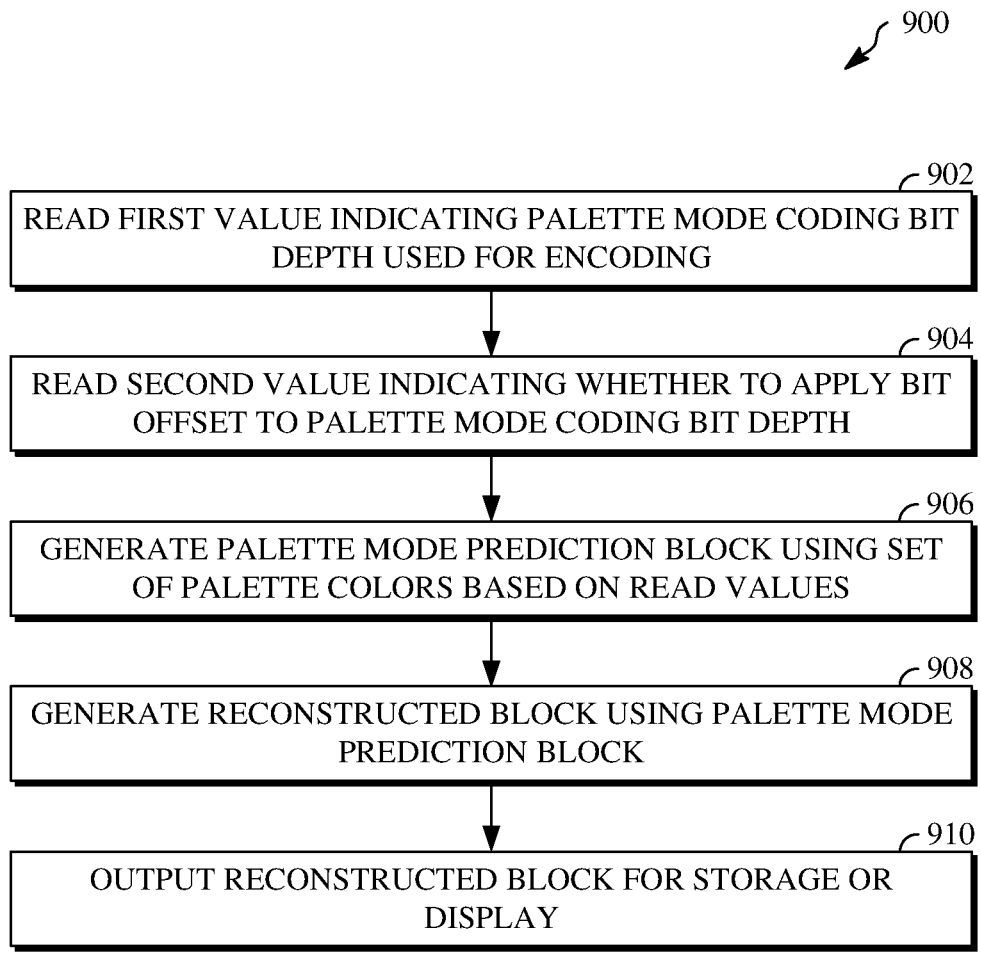
FIG. 9 is a flowchart diagram of an example of a technique for decoding an encoded block using palette mode coding with designated bit depth precision.

Further details of techniques for palette mode coding with designated bit depth precision are now described. FIG. 8 is a flowchart diagram of an example of a technique 800 for encoding a current block using palette mode coding with designated bit depth precision. FIG. 9 is a flowchart diagram of an example of a technique 900 for decoding an encoded block using palette mode coding with designated bit depth precision.

The technique 800 and/or the technique 900 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 800 and/or the technique 900. The technique 800 and/or the technique 900 can be implemented using specialized hardware or firmware. For example, a hardware component configured to perform the technique 800 and/or the technique 900. As explained above, some computing devices may have multiple memories or processors, and the operations described in the technique 800 and/or the technique 900 can be distributed using multiple processors, memories, or both.

For simplicity of explanation, the techniques 800 and 900 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, the technique 800 for encoding a current block using palette mode coding with designated bit depth precision is shown. At 802, an initial bit depth for a current block is determined based on an input video signal which includes the current block. The initial bit depth is a bit precision to use to represent colors of the current block. For example, the input video signal may include video data having colors expressed using a particular bit precision. That particular bit precision is detected based on information within the input video signal and determined as the initial bit depth for the current block. For example, the input video signal may indicate to use a set of palette colors of an 8 bit, 10 bit, 12 bit, or other bit range to represent colors of the current block.

At 804, a bit depth for palette mode coding of the current block is determined. Where the initial bit depth is equal to or less than a maximum palette mode coding bit depth, for example, 8 bits, the initial bit depth may be used as the bit depth for palette mode coding of the current block. Alternatively, where the initial bit depth is greater than the maximum palette mode coding bit depth, the bit depth for palette mode coding of the current block may be set as equal to the maximum palette mode coding bit depth.

In some implementations, the initial bit depth may be less than or equal to the maximum palette mode coding bit depth, but scaled to a higher bit depth for processing before prediction using palette mode coding begins. In such a case, the bit depth for palette mode coding of the current block is determined based on whether the scaled bit depth is greater than the maximum palette mode coding bit depth. For example, where the scaled bit depth is equal to or less than a maximum palette mode coding bit depth, the scaled bit depth may be used as the bit depth for palette mode coding of the current block. Alternatively, where the scaled bit depth is greater than the maximum palette mode coding bit depth, the bit depth for palette mode coding of the current block may be set as equal to the maximum palette mode coding bit depth. In other such cases, the bit depth for palette mode coding of the current block may be the scaled bit depth even if the scaled bit depth is greater than the maximum palette mode coding bit depth.

At 806, a palette mode prediction block is generated using a set of palette colors determined based on the bit depth. Thus, the set of palette colors includes colors within a bit range for the determined bit depth. Given the limits to the bit depth based on the maximum palette mode coding bit depth, the set of palette colors is limited based on the maximum palette mode coding bit depth. Limiting the set of palette colors based on the maximum palette mode coding bit depth includes scaling down the set of palette colors to the 8-bit range instead of using a set of palette colors of the initial or scaled bit depth range. For example, the set of palette colors to be written to the bitstream for the current block may indicate the first base color thereof using a bit depth of 8 bits. Other colors of the set of palette colors for the current block may be written to the bitstream using a delta value having a maximum possible value of 255. In this way, a policy of representing sets of palette colors for blocks in a bitstream using 8 bits may be enforced to reduce overhead.

Palette mode coding is then performed, for example, as described in AV1, but using the set of palette colors determined based on the bit depth for the current block. The output of the palette mode coding is a palette mode prediction block. At 808, a prediction residual is generated using the palette mode prediction block. For example, the prediction residual may be generated to represent the difference between the current block and the palette mode prediction block.

At 810, the prediction residual and syntax elements indicative of the bit depth are encoded to a bitstream. Encoding the prediction residual may include performing one or more of transformation, quantization, or entropy encoding operations against the prediction residual to prepare the prediction residual to be written to the bitstream. The syntax elements include a first value indicating the bit depth determined for the palette mode coding of the block, such as the variable palette_bit_depth, and a second value indicating whether to apply a bit offset to the palette mode coding bit depth, such as the variable palette_bit_offset. The bit offset is applied where that bit depth is different from the initial or scaled bit depth.

The syntax elements may be written to a sequence header associated with the current block. Alternatively, the syntax elements may be written to a frame header associated with the current block. The syntax elements may further identify one or more palette colors to use for the decoding of the encoded block, for example, as described above.

In some implementations, the first value and the second value may be written to the bitstream as a single value. For example, the single value may be four bits identifying both the palette mode coding bit depth and the bit offset.

Referring first to FIG. 9, the technique 900 for decoding an encoded block using palette mode coding with designated bit depth precision is shown. At 902, a first value indicating a palette mode coding bit depth used for encoding an encoded block, such as the variable palette_bit_depth, is read from a bitstream which includes the encoded block. The first value may, for example, be written in the bitstream using three bits. At 904, a second value indicating whether to apply a bit offset to the palette mode coding bit depth, such as the variable palette_bit_offset, is read from the bitstream. The second value may, for example, be written in the bitstream using one bit.

In some implementations, the first value and the second value may be encoded to a sequence header within the bitstream. For example, the syntax elements may be used for palette mode coding of blocks within a series of consecutive frames associated with the sequence header. In this way, the same palette mode values may be re-used for multiple frames. In some implementations, the first value and the second value may be encoded to a frame header within the bitstream. For example, the syntax elements may be used for palette mode coding of blocks of the frame associated with the frame header. In this way, palette mode values are determined for individual frames. In some implementations, the first value is read from the bitstream before the second value. In some implementations, the second value is read from the bitstream before the first value.

In some implementations, the first value and the second value may be read from the bitstream as a single value. For example, the single value may be four bits identifying both the palette mode coding bit depth and the bit offset.

At 906, a palette mode prediction block is generated using a set of palette colors determined based on the first value and the second value. In particular, the set of palette colors is determined based on whether a bit depth for the encoded block is greater than a maximum palette mode coding bit depth. The bit depth for the encoded block may be determined by shifting the palette mode coding bit depth according to the bit offset. When the second value indicates to apply the bit offset, this means that the bit depth is greater than the maximum palette mode coding bit depth. In such a case, the set of palette colors is limited based on a maximum palette mode coding bit depth. For example, where the maximum palette mode coding bit depth is 8 bits, the set of palette colors is limited to an 8-bit precision color palette. However, when the second value indicates other than to apply the bit offset, the set of palette colors may instead be based on the palette mode coding bit depth. This is because the bit depth for the encoded block is equal to or less than the maximum palette mode coding bit depth when the bit offset is not applied.

Palette mode coding is then performed, for example, as described in AV1, but using the set of palette colors determined based on the first value and the second value. The output of the palette mode coding is a palette mode prediction block. At 908, a reconstructed block is generated using the palette mode prediction block. For example, the reconstructed block may be generated by reconstructing a prediction residual associated with the encoding block using the palette mode prediction block. At 910, the reconstructed block is output for storage or display.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more." unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 and the decoder 500, or another encoder or decoder as disclosed herein) can be realized in hardware, software, or any combination thereof. The hardware can include, for example, computers (e.g., apparatuses), intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102 can encode content into an encoded video signal and transmit the encoded video signal to the communications device. In turn, the communications device can then decode the encoded video signal. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor (e.g., a non-transitory computer-readable storage device including program instructions executable by one or more processors). The medium can be, for example, an electronic, magnetic, optical, electromagnetic, or semiconductor device. Other suitable mediums are also available.

The above-described implementations and other aspects have been described to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law to encompass all such modifications and equivalent arrangements.

What is claimed is:

1. A method for decoding an encoded block from a bitstream, the method comprising:
   reading, from the bitstream, a first value indicating a palette mode coding bit depth used to encode the encoded block;
   reading, from the bitstream, a second value indicating whether to apply a bit offset to the palette mode coding bit depth;
   generating a palette mode prediction block for the encoded block using a set of palette colors determined based on the first value and the second value, wherein, when the second value indicates to apply the bit offset, the set of palette colors is limited based on a maximum palette mode coding bit depth;
   generating a reconstructed block using the palette mode prediction block; and
   outputting the reconstructed block for storage or display.

2. The method of claim 1, further comprising:
   shifting the palette mode coding bit depth according to the bit offset to determine a bit depth for the encoded block, wherein the set of palette colors is limited based on the bit depth being greater than the maximum palette mode coding bit depth.

3. The method of claim 1, wherein the maximum palette mode coding bit depth is 8 bits.

4. The method of claim 1, wherein the first value and the second value are encoded to a sequence header within the bitstream.

5. The method of claim 1, wherein the first value and the second value are encoded to a frame header within the bitstream.

6. The method of claim 1, wherein the first value is written in the bitstream using three bits and the second value is written in the bitstream using one bit.

7. The method of claim 1, wherein the first value and the second value are read from the bitstream as a single value.

8. An apparatus for decoding an encoded block from a bitstream, the apparatus comprising:
   a memory; and
   a processor configured to execute instructions stored in the memory to:
      read, from the bitstream, a first value indicating a palette mode coding bit depth used to encode the encoded block;
      read, from the bitstream, a second value indicating whether to apply a bit offset to the palette mode coding bit depth;
      generate a palette mode prediction block for the encoded block using a set of palette colors determined based on the first value and the second value;
      generate a reconstructed block using the palette mode prediction block; and
      output the reconstructed block for storage or display,
      wherein, when the second value indicates to apply the bit offset, the set of palette colors is limited based on a maximum palette mode coding bit depth, and
      wherein, when the second value indicates other than to apply the bit offset, the set of palette colors is based on the palette mode coding bit depth.

9. The apparatus of claim 8, wherein the instructions include instructions to:
   when the second value indicates to apply the bit offset, shift the palette mode coding bit depth according to the bit offset to determine a bit depth for the encoded block, wherein the set of palette colors is limited based on the bit depth being greater than the maximum palette mode coding bit depth.

10. The apparatus of claim 8, wherein the maximum palette mode coding bit depth is 8 bits.

11. The apparatus of claim 8, wherein the first value and the second value are encoded to a sequence header within the bitstream.

12. The apparatus of claim 8, wherein the first value and the second value are encoded to a frame header within the bitstream.

13. The apparatus of claim 8, wherein the first value and the second value are read from the bitstream as a single value.

14. A non-transitory computer-readable storage device including program instructions executable by one or more processors that, when executed, cause the one or more processors to perform operations for decoding an encoded block from a bitstream, the operations comprising:
   reading, from the bitstream, a first value indicating a palette mode coding bit depth used to encode the encoded block and a second value indicating whether to apply a bit offset to the palette mode coding bit depth;
   generating a prediction block for the encoded block using a set of palette colors determined based on the first value and the second value, wherein, when the second value indicates to apply the bit offset, the set of palette colors is limited based on a maximum palette mode coding bit depth; and outputting, for storage or display, a reconstructed block generated using the prediction block.

15. The non-transitory computer-readable storage device of claim 14, the operations further comprising:

shifting the palette mode coding bit depth according to the bit offset to determine a bit depth for the encoded block, wherein the set of palette colors is limited based on the bit depth being greater than the maximum palette mode coding bit depth.

16. The non-transitory computer-readable storage device of claim 14, wherein the maximum palette mode coding bit depth is 8 bits.

17. The non-transitory computer-readable storage device of claim 14, wherein, when the second value indicates other than to apply the bit offset, the set of palette colors is based on the palette mode coding bit depth.

18. The non-transitory computer-readable storage device of claim 14, wherein the first value and the second value are encoded to a sequence header within the bitstream.

19. The non-transitory computer-readable storage device of claim 14, wherein the first value and the second value are encoded to a frame header within the bitstream.

20. The non-transitory computer-readable storage device of claim 14, wherein the first value and the second value are read from the bitstream as a single value.

\* \* \* \* \*